June 19, 1956  J. V. FITZGERALD  2,751,477
ELECTRICAL RESISTIVE DEVICE
Filed July 15, 1952
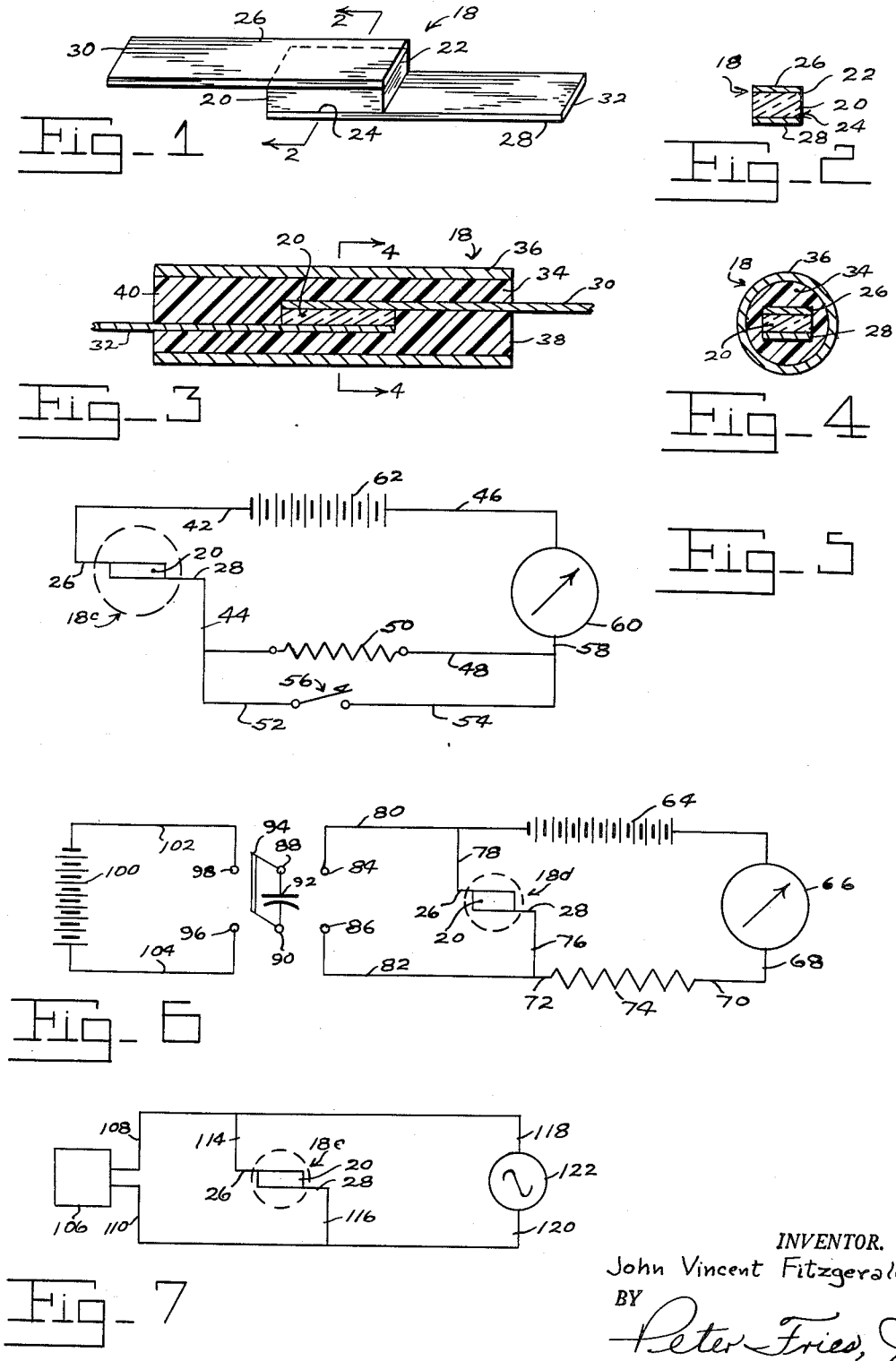
INVENTOR.
John Vincent Fitzgerald.
BY
Peter Fries, Jr.
ATTORNEY United States Patent Office 2,751,477
Patented June 19, 1956

2,751,477

ELECTRICAL RESISTIVE DEVICE

John Vincent Fitzgerald, New Kensington, Pa., assignor to Pittsburgh Plate Glass Company, Allegheny County, Pa., a corporation of Pennsylvania Application July 15, 1952, Serial No. 299,045

7 Claims. (Cl. 201—73)

This invention relates to improvements in electrical devices.

An object of the invention is to provide a novel and improved electrical device which utilizes unusual electrical properties of certain glass-like materials in order to provide for novel types of controllable electrical action.

Another object of the invention is to provide a novel electrical device which is based upon the discovery of certain novel aspects, features and properties of glass-like and glass compositions of the silver borate and silver phosphate type, and the application of these features or characteristics to the problem of control of electrical currents, protection of electrical instruments and the like, and in general to problems for which the characteristics referred to offer simple and useful solutions.

A further object of the invention is to provide a novel electrical device whose electrical conductivity can be varied and controlled in accordance with an applied voltage or potential, and in which the sensitivity, expressed in terms of the change in electrical conductivity with the magnitude of the applied voltage, can be made very great.

Still another object of the invention is to provide a device of the character described, which exhibits the property of being substantially electrically non-conducting for a certain range of applied voltages, which becomes conducting when the voltage is raised beyond the aforesaid range, and which returns to its non-conducting state upon either a further increase in voltage, or the application of a charge as from a condenser or the like.

Still a further object of the invention is to provide a device which, while normally an insulator or very poor electrical conductor, can be made to become a temporary good conductor of electricity upon the application of a suitable voltage, and which can be accurately constructed so as to undergo this change at a precisely determined value of the applied potential.

Another object of the invention is to provide an unusual and novel electrical device of the character described, which is simple in design, inexpensive to manufacture, and highly efficient and effective for its many and varied purposes.

These and other objects and advantages of the invention will become apparent from the following description of a preferred embodiment thereof, as illustrated in the accompanying drawings, forming a part hereof, and in which, Figure 1 is a perspective view of a device embodying the invention.

Figure 2 is a sectional elevational view taken on plane 2—2 of Figure 1.

Figure 3 is a longitudinal sectional elevational view of a similar unit encased in a protective envelope.

Figure 4 is a sectional elevational view taken on plane 4—4 of Figure 3.

Figure 5 is a schematic diagram of one form of electrical circuit according to the invention, and including a device of the type shown in the preceding views.

Figure 6 is a schematic diagram of another form of electrical circuit according to the invention, and showing a modification of the invention.

Figure 7 is a schematic diagram of another electrical circuit showing another form of the invention, and including the use of alternating current therein.

The present invention comprises the construction and use of an electrical device having unusual electrical characteristics, such as a marked alteration in electrical conductivity when subjected to different voltages or currents, and even to different electrical fields and the like. It has been found that certain glasses and glass-like materials which include such elements as silver in their composition, and especially silver borate and silver phosphate, can be utilized as either relatively good conductors of electricity or as relatively poor conductors, or as both, the selection of the desired state of conductivity being made by a change either in the potential applied to a layer of the glass composition, as by a galvanic circuit, or alternatively by the application to the glass layer of an electric charge or an electric field in the nature of a charged space and the like, a discharge such as a corona discharge, or other sources of electric fields.

According to the invention, by use of the novel construction, compositions, and arrangement in circuits, a valve-like action can be obtained in a very simple manner, so that the flow of electrical currents may be readily controlled instantaneously, and hence one application is the use thereof as a protective device for other electrical equipment, for instance of a delicate nature. In order to understand clearly the nature of the invention, and the best means for carrying it out, reference may now be had to the drawings, in which like numerals denote similar parts throughout the several views.

The practice of the invention, as at present known, depends upon the special and unusual properties of a silver-containing glass-like or glass material, such as silver borate glass, silver phosphate glass, and silver aluminum phosphate glass. So far as known, the properties are not evidenced, at least to a useful degree, by glass-like materials or glass other than the ones which contain the silver as above. Examples of silver borate glasses having the desired properties are as follows:

|  | Percent |
|---|---|
| 1. $B_2O_3$ | 45 |
| $SiO_2$ | 5 |
| $Ag_2O$ | 50 |
| 2. $B_2O_3$ | 40 |
| $SiO_2$ | 5 |
| $Ag_2O$ | 55 |

A suitable silver phosphate glass can be very conveniently made from silver metaphosphate, which is $AgPO_3$, containing 66.4 per cent $Ag_2O$ and 33.6 per cent $P_2O_5$. In such silver phosphate, and silver-aluminum phosphate glasses, it has been found that the silver concentration should be at least about 20 per cent by weight, and in the case of the silver borate glasses the silver concentration should be at least 30 per cent by weight. All such glass or glass-like materials may or may not contain other ingredients, such as $SiO_2$ or $Al_2O_3$. In some samples, devitrification, evidenced by cloudiness, was noted, especially in the case of the silver borate glasses, but this did not appear to alter the electrical behavior according to the invention. Therefore this invention is not necessarily confined to glasses as such, but also includes vitreous or glass-like materials of the various compositions and ranges described herein or claimed. The terms glass and glass-like or vitreous material are used interchangeably in this application and are meant to include amorphous, crystalline and partially crystalline materials of this nature, the silver containing substance or substances being incorporated in the said materials according to the invention.

Referring now to Figures 1 and 2 of the drawings, there is shown one example of a device incorporating the principles of the invention, and comprising a relatively thin unit body 20 forming a thin layer of a silver-containing glass or vitreous material as described hereinabove. The unit body 20 has upper and lower surfaces 22 and 24, upon which are fastened the electrode strips 26 and 28 respectively, which may in turn be connected at their ends 30 and 32 respectively, into an electrical circuit or to an electrical device as needed. In the example shown, the thickness of the vitreous unit body 20 may be of the order of 0.1 centimeter, and the area of the glass in contact with the two electrodes 26 and 28 may be of the order of 0.02 cm.$^2$. Good electrical contact between the glass unit body 20 and the electrodes 26 and 28, which may be formed of thin silver or platinum metal strips, or equivalent material, can readily be obtained by subjecting the body 20 to sufficient heat to fuse it in place to each of the strips 26 and 28, or by soldering or otherwise affixing the strips in place, as two metal layers sputtered upon the glass 20 or by other well-known techniques, which provide good electrical contact therewith.

Where the electrical unit thus shown at 18 in Figures 1 and 2, is not otherwise protected from the possibly deleterious effects of light and air, the unit of Figures 1 and 2 may be varnished or otherwise coated, sealed in an evacuated envelope or otherwise embedded in a matrix. Figures 3 and 4 thus show one form of the invention, by way of example, in which the unit shown at 18 in Figures 1 and 2 and comprising the unit vitreous body 20 and the two electrodes 26 and 28 secured thereto, are embedded in a matrix 34 of good insulating material, such as plastic of suitable composition, such as that known commercially as "Selectron 5003" or other well known insulating compositions, the matrix being shown as cylindrical, with left and right end surfaces 40 and 38 as seen in Figure 3. An outer casing 36 encloses the insulating cylinder matrix 34, and may be formed of suitable material including glass, being shown as a cylindrical tube or sleeve. One form of the device shown in Figures 3 and 4 was only about one-half inch long and one-quarter inch in outside diameter, but it may be made larger or smaller as required.

Figure 5 is a schematic diagram which will illustrate certain novel aspects of the invention in circuit form, and particularly the plurality of states that may be obtained in the device of the invention under different electrical conditions. In this diagram, the silver glass and electrode unit is designated generally by the reference numeral 18c, including the aforementioned silver-glass unit body 20 and electrodes 26 and 28, connected in series with the battery 62 of suitable potential, for example only of 4.5 volts. A milliammeter 60 is interposed in the circuit as shown, being connected to wires 46 and 58, and a resistor 50 is connected at one end by wire 48 to one side of meter 60, being in turn connected by wire 44 to silver-unit device 18c, connected by wire 42 to the other side of battery 62 to complete the circuit. A normally open switch 56 is connected by wires 52 and 54 across the resistance 50, so as to short-circuit the same when depressed. In the arrangement shown, the resistor 50 may have a value of 1000 ohms by way of example only.

As seen in Figure 5, the silver-glass unit 18c would normally be a non-conductor of electricity, but under the voltage applied thereto in this circuit, as mentioned herein, it will have a resistance of the order of about 200 ohms. Assuming for example, that the internal resistance of the milliammeter 60 is 1800 ohms, it will thus be apparent that the complete circuit resistance is approximately 3000 ohms, and therefore the potential drop across silver-glass unit 18c under these conditions is about 0.3 volt.

When, however, the switch 56 is closed, so as to short-circuit the resistor 50, the resistance of the silver-glass unit 18c immediately rises to something of the order of $10^9$ ohms under the influence of the enhanced electromotive force imposed thereon, which must now be of the order of the voltage of battery 62, or 4.5 volts. Opening the switch 56 restores the resistor 50 to the circuit and the resistance of the silver-glass unit returns to its former value of about 200 ohms.

The above characteristics apply to the type of unit shown in Figures 1 to 4, and of the stated dimensions. By altering the thickness or area of the glass material 20, the normal value of resistance of unit 18c as seen in Figure 5, may readily be made to be 10 ohms or 1000 ohms, or any other value, and the resistance under the so-called non-conducting condition as mentioned above, may become $10^6$ or $10^{13}$ ohms. The values depend also, of course, upon the composition of the particular glass employed.

It is apparent that, by the use of the unit 18c, the meter 60 or any other circuit element may be readily protected against excessive current flow resulting from increased voltages or decreased resistances in the series circuit. In addition, however, such a unit can also be controlled as to its resistance by the application of an electric charge, as from a condenser or the like.

Thus in Figure 6, the unit 18d, which is similar to any of those shown in Figures 1 to 4, is shown in series with a battery 64, a meter 66, and a resistor 74, these portions having the same values of voltage and resistance as the battery 62, meter 60 and resistor 50 of Figure 5. In addition, a pair of terminals 84 and 86 are connected by wires 80 and 82 and leads 76 and 78, across the silver-glass unit 18d, these terminals being part of a double-pole double-throw switch 94, whose blade terminals 88 and 90 have connected thereto a variable condenser 92, for example a laboratory decade condenser. Terminals 96 and 98 of the switch have connected thereacross by wires 102 and 104, a battery 100, of 35 volts. Assuming that the condenser 92 has a value of 0.001 microfarad, and has been charged to 35 volts by throwing switch 94 to the left, the resistance of silver-glass unit 18d, which is normally 200 ohms in its conductive state, will momentarily be raised to a high value such as about $10^9$ ohms when switch 94 is thrown to the right to connect the condenser 92 across the unit 18d. The length and duration of the high-resistance state in this instance would be only a fraction of a second, or until condenser 92 was substantially discharged. By adjusting the 92 condenser to a value of about 1 microfarad, the high-resistance state of the unit 18d will be maintained for several minutes. Calculations show that, in this general way, a current of 0.001 coulomb per second (amperes) can be momentarily interrupted by a charge as small as $3.5 \times 10^{-8}$ coulombs.

In addition, the flow of current in unit 18d, while in its "conductive" (low resistance) state, can be partially or completely shut off by other electric or magnetic fields; for example, by lightning, a static charge, electric sparks, a thunderstorm or the field of an electric motor.

It has also been observed that, when unit 18d is in its temporarily induced non-conductive state, its conductivity may be restored by a gradual but substantial increase in the potential applied thereto by the circuit. For example, an increase of from 3 to 10 volts, or from 20 to 50 volts, depending upon the characteristics of the unit 18d and the other circuit elements, will restore this conductive state.

It will be noted that the phenomena described above do not appear to depend upon dielectric breakdown in the sense in which that term is used to signify electric puncture of a dielectric material. Thus, actual tests made by probing samples of a silver phosphate glass of various thicknesses by means of a silver cat-whisker, showed actual dielectric breakdown voltages as shown in the following table:

Table

| Thickness of AgPO₃ class (inches) | Resistance (ohms) | Breakdown Voltage, volts | Resistance after breakdown for 50 milliampere current (ohms) |
|---|---|---|---|
| 0.001 | $10^9$ | 18 | 7 |
| 0.008 | $10^{10}$ | 57 | 4 |
| 0.003 | over $10^{10}$ | 90 | 5 |
| 0.005 | over $10^{10}$ | 168 | 10 |
| 0.007 | over $10^{10}$ | 195 | 2 |

Thus, for the unit of Figures 1 to 4, using a thickness of element 20 of 0.01 cm. (0.004 inch), the dielectric breakdown voltage was not exceeded or even approached. Such units, however, when in their non-conductive state, are found to become quite conductive when the breakdown potential is reached, typical values of resistance after breakdown being shown in the last column of the table above, at the right thereof.

The schematic diagram of Figure 7 will illustrate still another form of the invention and its application to the control of alternating currents. In this diagram, the silver-glass and electrode unit 18e, being similar to those shown in Figures 1 to 4, is shown as connected in series with the output of an audio oscillator 106, by means of the lead wires 114 and 116, and 108 and 110. The conductivity of the unit 18e can be varied by applying static charges from a portable static or spark generator to the electrodes 26 and 28. The wires 118 and 120 connect the silver-glass unit 18e to the oscillograph 122, for measurement of the various conducting states thereof. By the arrangement shown, alternating currents of a few milliamperes of frequencies of from 2 to 200,000 cycles per second were easily controlled in the same manner as described above for direct currents.

These effects make it possible to provide a protective device in the nature of a lightning arrestor, such as widely used to protect radio receivers, transformers, telephone equipment and the like, from excessive voltages and surges which might otherwise cause serious damage. Air gaps are normally used for this purpose, but they have certain limitations, being dependent upon ambient conditions to some extent which may cause variations in the critical breakdown voltage. They are also difficult to adjust for small breakdown voltages, such as 50 to 200 volts, yet delicate electrical parts, such as tubes and instruments, require protection of this order.

The silver glasses described herein provide a range of critical breakdown voltages which makes it possible to provide this type of protection, in the indicated ranges, for the first time, with reasonable dependability and efficiency. Actually, the glass layer 20 may be dimensioned so that breakdown can be obtained by voltages of a fraction of a volt, if necessary, the term "breakdown" being here used in the sense of the invention, that is, a temporary blocking or valve action. The units may be constructed substantially like those shown in Figures 1 to 4, but will normally be connected between the protected line and a ground connection, in the known manner of lightning arrestors. In appropriate sizes, such units may carry surge currents of many amperes, diverting such currents from the delicate parts through which they would otherwise pass.

It will be seen from the above description that the novel units of the present invention possess two different characteristics which obtain at different orders of applied voltage; one, a conversion from conductive to non-conductive state at a voltage below that of conventional puncture breakdown, and two, a conversion from non-conducting to conducting state at voltages exceeding the conventional breakdown of dielectric puncture. The breakdown potentials of this higher range are still lower, by a factor of the order of 30, than those characteristic of common glass dielectrics, so that the protective devices can be constructed for purposes that could not be satisfied by other materials, such as conventional glasses, having good normal dielectric properties but high breakdown potentials.

The precise mechanism by which the silver-containing glasses or materials mentioned herein are endowed with these properties is not known absolutely. However, as a tentative hypothesis, and without intention of limiting the invention thereby, it may be considered that the results flow from the fact that silver borate and silver phosphate glasses and materials contain both silver atoms and silver ions, and that these are in equilibrium spatial concentration. The particles are in constant thermal vibration and also participate in random thermal diffusion. The diffusional motion of the ions, but not of the atoms, is influenced by an applied electromotive force to produce a net drift of charge in the direction of the electric field. Random thermal diffusion of ions and atoms, and the chemical kinetics of the equilibrium reactions between the ions, atoms and the glass or crystal network tend to replenish diffused ions and maintain a continuous unpolarized flow of current under normal conditions. A sudden increase in electromotive force imposed upon the silver glass or materials temporarily depletes the surface layer adjacent the anode of silver ions, thus rendering the glass non-conductive. Thermal diffusion of ions and conversion of silver atoms to ions quickly replaces the lost ions, not however without a measurable time delay which is characteristic of diffusional processes, and the glass becomes again conductive.

On the same hypothesis, a large increase in the applied potential may cause dielectric breakdown of the non-conducting layer, or localized heating and increased rates of atom-ion conversion, to restore the normal conducting state therein in a shorter time than the ordinary processes, should this be desirable. Whatever the mechanism by which the novel effects are produced, they can be applied to a variety of control and protective functions.

Although I have described my invention in specific terms, it will be understood that various changes may be made in size, shape, materials and arrangement without departing from the spirit and scope of the invention as claimed.

I claim:

1. An electrical device comprising a layer of glass consisting essentially of 50 to 55 per cent by weight of silver oxide, 40 to 45 per cent by weight of boric oxide and about 5 per cent by weight of silicon dioxide, and electrodes in contact with opposite surfaces of said layer.

2. An electrical device comprising a layer of glass consisting essentially of 50 to 55 per cent by weight of silver oxide, 40 to 45 per cent by weight of boric oxide, and about 5 per cent by weight of silicon dioxide, electrodes in contact with opposite surfaces of said layer, and a body of protective material embedding said layer and parts of said electrodes.

3. An electrical device comprising a layer of a silver oxide-boric oxide-silica glass and electrodes in contact with opposite surfaces of said layer.

4. An electrical device comprising a layer of a silver oxide-boric oxide-silica glass, electrodes in contact with opposite surface of said layer, and a body of protective material embedding said layer and parts of said electrodes.

5. An electrical protective device comprising a layer of a silver oxide-boric oxide-silica glass, an electrode in contact with opposite surfaces of the layer, said device being characterized by a breakdown potential of approximately 20 kilovolts per inch.

6. A non-linear resistance element comprising a silver oxide-boric oxide-silica glass.

7. A non-linear resistant element comprising a glass consisting essentially of 50 to 55 per cent by weight of silver oxide, 40 to 45 per cent by weight of boric oxide, and about 5 per cent by weight of silicon dioxide.

References Cited in the file of this patent

UNITED STATES PATENTS

| | | |
|---|---|---|
| 1,922,221 | Steenbeck et al. | Aug. 15, 1933 |
| 2,461,878 | Christensen et al. | Feb. 15, 1949 |
| 2,489,409 | Green et al. | Nov. 29, 1949 |